United States Patent
Evans et al.

(10) Patent No.: US 12,523,172 B1
(45) Date of Patent: Jan. 13, 2026

(54) CRYOGENIC BOTTOMING CYCLE ADAPTABLE HEAT REJECTION LOOP SPLIT

(71) Applicant: RTX Corporation, Farmington, CT (US)

(72) Inventors: Brandon M. Evans, San Antonio, TX (US); Neil J. Terwilliger, Cheshire, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/770,819

(22) Filed: Jul. 12, 2024

(51) Int. Cl.
*F02C 7/22* (2006.01)
*F02C 7/10* (2006.01)
*F02C 7/32* (2006.01)

(52) U.S. Cl.
CPC .................. *F02C 7/10* (2013.01); *F02C 7/22* (2013.01); *F02C 7/32* (2013.01); *F05D 2220/323* (2013.01); *F05D 2260/20* (2013.01)

(58) Field of Classification Search
CPC .... F02C 7/224; F02C 1/04; F02C 1/06; F01K 23/08; F01K 23/10
See application file for complete search history.

(56) References Cited

U.S. PATENT DOCUMENTS

| | | | | |
|---|---|---|---|---|
| 6,374,591 B1 * | 4/2002 | Johnson | ........... | F01K 23/10 60/785 |
| 6,960,839 B2 * | 11/2005 | Zimron | ........... | F01K 25/08 290/2 |
| 7,980,081 B2 * | 7/2011 | Mak | ........... | F02C 7/18 60/39.093 |
| 10,473,029 B2 * | 11/2019 | Conlon | ........... | F02C 6/14 |
| 11,230,948 B2 | 1/2022 | Mcauliffe et al. | | |
| 11,773,778 B1 | 10/2023 | Retersdorf et al. | | |
| 2010/0107634 A1 * | 5/2010 | Xu | ........... | F17C 9/04 60/671 |
| 2015/0300260 A1 * | 10/2015 | Wollenweber | ........... | F02C 9/40 60/39.12 |

(Continued)

*Primary Examiner* — Thuyhang N Nguyen
(74) *Attorney, Agent, or Firm* — Carlson, Gaskey & Olds, P.C.

(57) ABSTRACT

An aircraft propulsion system includes a core engine that includes a main compressor where an inlet airflow is compressed and communicated to a combustor to generate an exhaust gas flow that is expanded through a main turbine section to generate power that is used to drive the main compressor and a propulsive fan, a bottoming cycle where a working fluid is heated and expanded through a bottom turbine to generate shaft power, the bottoming cycle includes a primary compressor loop that includes a first bottoming compressor and a secondary compressor loop that includes a second bottoming compressor and the flow of working fluid flow is adjusted to flow through at least one of the primary compressor loop and the secondary compressor loop, an exhaust gas heat exchanger where heat from the exhaust gas flow heats the working fluid of the bottoming cycle, a cryogenic fuel system that includes a cryogenic fuel storage tank, a fuel flow path for routing the cryogenic fuel to the combustor of the core engine, and a fuel/working fluid heat exchanger for cooling the working fluid within the primary compressor loop. The secondary compressor loop bypasses the fuel/working fluid heat exchanger.

17 Claims, 2 Drawing Sheets

(56) References Cited

U.S. PATENT DOCUMENTS

| | | |
|---|---|---|
| 2020/0224557 A1 | 7/2020 | Mcauliffe et al. |
| 2021/0301720 A1* | 9/2021 | Staubach ................ F02C 1/007 |
| 2024/0026824 A1 | 1/2024 | Terwilliger et al. |

* cited by examiner

CRYOGENIC BOTTOMING CYCLE ADAPTABLE HEAT REJECTION LOOP SPLIT

TECHNICAL FIELD

The present disclosure relates generally to a bottom cycle for an aircraft propulsion system and more specifically to a bottoming cycle that utilizes a cryogenic fuel as a heat sink.

BACKGROUND OF THE INVENTION

Gas turbine engines typically include a compressor where inlet air is compressed and delivered into a combustor. In the combustor, the compressed air is mixed with fuel and ignited to generate an exhaust gas flow. The exhaust flow is expanded through a turbine section to generate shaft power used to drive the compressor and a propulsive fan. Some energy in the high energy exhaust flow is recovered as it is expanded through a turbine section. However, a large amount of energy in the form of heat is simply exhausted from the turbine section to the atmosphere. A bottoming cycle utilizes reclaimed heat to generate additional useful work. A working fluid in the bottoming cycle is heated to drive a secondary turbine to generate additional shaft power. The working fluid in the bottoming cycle is then cooled, compressed, and reheated before expansion back through the turbine. The capability of the working fluid to accept heat limits energy recovery of the bottoming cycle.

SUMMARY OF THE INVENTION

An aircraft propulsion system according to an exemplary embodiment of this disclosure, among other possible things includes a core engine that includes a main compressor where an inlet airflow is compressed and communicated to a combustor to generate an exhaust gas flow that is expanded through a main turbine section to generate power that is used to drive the main compressor and a propulsive fan, a bottoming cycle where a working fluid is heated and expanded through a bottom turbine to generate shaft power, the bottoming cycle includes a primary compressor loop that includes a first bottoming compressor and a secondary compressor loop that includes a second bottoming compressor and the flow of working fluid flow is adjusted to flow through at least one of the primary compressor loop and the secondary compressor loop, an exhaust gas heat exchanger where heat from the exhaust gas flow heats the working fluid of the bottoming cycle, a cryogenic fuel system that includes a cryogenic fuel storage tank, a fuel flow path for routing the cryogenic fuel to the combustor of the core engine, and a fuel/working fluid heat exchanger for cooling the working fluid within the primary compressor loop. The secondary compressor loop bypasses the fuel/working fluid heat exchanger In a further embodiment of the foregoing, the aircraft propulsion system further includes a first recuperation heat exchanger that communicates thermal energy between a working fluid flow downstream from both the first bottoming compressor and the second bottoming compressor with working fluid flow downstream from the bottoming turbine.

In a further embodiment of any of the foregoing, the aircraft propulsion system further includes a second recuperation heat exchanger that communicates thermal energy between a working fluid flow between the first bottoming compressor and second bottoming compressor and downstream from the bottoming turbine.

In a further embodiment of any of the foregoing aircraft propulsion systems, the primary compressor loop includes a bypass passage around the second bottoming compressor.

In a further embodiment of any of the foregoing, the aircraft propulsion system further includes a valve system for selectively directing the working fluid through at least one or both of the primary compressor loop and the secondary compressor loop.

In a further embodiment of any of the foregoing, the aircraft propulsion system further includes a controller for operating the valve system to adjust operation of the bottoming cycle in response to available thermal capacity of the cryogenic fuel system to absorb heat.

In a further embodiment of any of the foregoing aircraft propulsion systems, the controller is further programmed to operate the charger system to maintain a desired volume of working fluid based on operation of the primary compressor loop and the secondary compressor loop.

In a further embodiment of any of the foregoing, the aircraft propulsion system further includes a charger system for maintaining a desired volume of working fluid within the primary compressor loop and the secondary compressor loop.

In a further embodiment of any of the foregoing, the aircraft propulsion system further includes a fuel/exhaust gas heat exchanger where the cryogenic fuel flow is heated before being communicated to the combustor of the core engine.

In a further embodiment of any of the foregoing, the aircraft propulsion system further includes an output shaft that is driven by the bottoming turbine for driving an accessory component.

A gas turbine engine according to another exemplary embodiment of this disclosure, among other possible things includes a core engine that includes a main compressor where an inlet airflow is compressed and communicated to a combustor to generate an exhaust gas flow that is expanded through a main turbine section to generate power that is used to drive the main compressor, a bottoming cycle where a working fluid is heated and expanded through a bottom turbine to generate shaft power, the bottoming cycle includes a primary compressor loop that includes a first bottoming compressor and a secondary compressor loop that includes a second bottoming compressor and the flow of working fluid flow is adjusted to flow through one of the primary compressor loop or the secondary compressor loop, an exhaust gas heat exchanger where heat from the exhaust gas flow heats the working fluid of the bottoming cycle, a cryogenic fuel system that includes a cryogenic fuel storage tank, a fuel flow path for routing the cryogenic fuel to the combustor of the core engine, a fuel/working fluid heat exchanger for cooling the working fluid within the primary compressor loop, the secondary compressor loop bypasses the fuel/working fluid heat exchanger, and a controller that is programmed to adjust operation of the bottoming cycle to route the working fluid flow through one of the primary compressor loop and the secondary compressor loop in response to available thermal capacity of the cryogenic fuel system to absorb heat.

In a further embodiment of the foregoing, the gas turbine engine further includes at least one recuperation heat exchanger that communicates thermal energy between a working fluid flow that is exhausted from at least one of the first bottoming compressor and the second bottoming compressor with working fluid flow that is exhausted from the bottoming turbine and before either of the first bottoming compressor and the second bottoming compressor.

In a further embodiment of any of the foregoing gas turbine engines, the primary compressor loop includes a bypass passage around the second bottoming compressor.

In a further embodiment of any of the foregoing, the gas turbine engine further includes a charger system for maintaining a desired volume of working fluid within the primary compressor loop and the secondary compressor loop. The controller is further programmed to operate the charger system to maintain a desired volume of working fluid based on operation of the primary compressor loop and the secondary compressor loop.

In a further embodiment of any of the foregoing, the gas turbine engine further includes a fuel/exhaust gas heat exchanger where the cryogenic fuel flow is heated before being communicated to the combustor of the core engine.

In a further embodiment of any of the foregoing, the gas turbine engine further includes an output shaft that is driven by the bottoming turbine for driving an accessory component.

In a further embodiment of any of the foregoing, the gas turbine engine further includes a propulsive fan that is driven by the core engine.

A method of operating an aircraft propulsion system according to another exemplary embodiment of this disclosure, among other possible things includes generating an exhaust gas flow in a combustor by igniting a mixture of compressed air and a cryogenic fuel, communicating thermal energy from the exhaust gas flow into a working fluid within a bottoming cycle where a heated working fluid is heated and expanded through a bottom turbine to generate shaft power, the bottoming cycle includes a primary compressor loop that includes a first bottoming compressor and a secondary compressor loop that includes a second bottoming compressor and the flow of working fluid flow is adjusted to flow through one of the primary compressor loop or the secondary compressor loop, cooling the working fluid that is exhausted from the bottoming turbine in a fuel/working fluid heat exchanger where a cryogenic fuel accepts heat from the working fluid, working fluid flow through the secondary compressor loop bypasses the fuel/working fluid heat exchanger, and adjusting a flow of the working fluid to flow within one of the primary compressor loop and the secondary compressor loop based on a determined available thermal capacity of the cryogenic fuel system to absorb heat from the working fluid.

In a further embodiment of the foregoing, the method further includes adjusting a volume of the working fluid within the primary compressor loop and the secondary compressor loop based on operation of the primary compressor loop and the secondary compressor loop.

In a further embodiment of any of the foregoing, the method further includes communicating thermal energy between a working fluid flow that is exhausted from at least one of the first bottoming compressor and the second bottoming compressor with working fluid flow exhausted from the bottoming turbine and before either of the first bottoming compressor and the second bottoming compressor with at least one recuperation heat exchanger.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
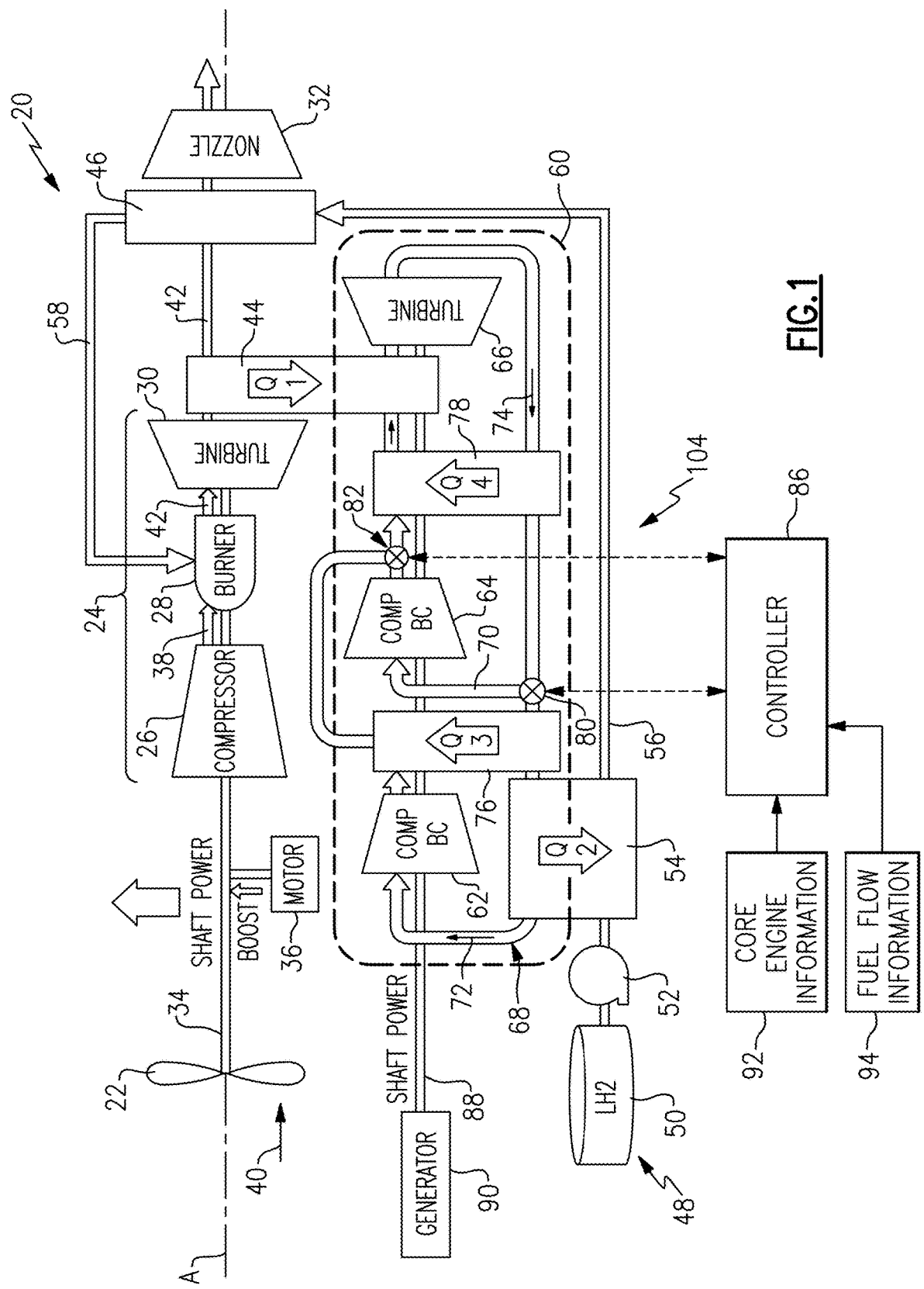
FIG. 1 is a schematic view of an example aircraft propulsion system including an adaptable bottoming cycle.

FIG. 1 schematically illustrates an aircraft propulsion system 20 that includes a bottoming cycle 60 a primary compressor loop 68 and a secondary compressor loop 70 that enables adaptation to changing thermal heat sink capacities.

The example propulsion system 20 is disclosed as a core engine 24 that generates shaft power utilized to drive a propulsive fan 22. The example core engine 24 includes a compressor section 26, a combustor section 28 and the turbine section 30 disposed along the longitudinal axis A. The fan 22 drives an inlet airflow 40 into the compressor section 26. The inlet flow 40 is compressed and communicated as pressurized core flow 38 to the combustor section 28 where the compressed inlet flow 40 is mixed with a fuel flow 58 and ignited to generate the exhaust gas flow 42. The exhaust gas flow 42 expands through the turbine section 30 where energy is extracted and utilized to generate shaft power to drive an engine shaft 34. The engine shaft 34 drives the compressor section 26 and the fan 22. The exhaust gas flow 42 is subsequently exhausted through a nozzle 32.

Although an example engine architecture is disclosed by way of example, other turbine engine architectures are within the contemplation and scope of this disclosure. Moreover, although the disclosed non-limiting embodiment depicts a turbofan turbine engine, it should be understood that the concepts described herein are not limited to use with turbofans as the teachings may be applied to other types of turbine engines. Additionally, the features of this disclosure may be applied to other engine configurations utilized to generate shaft power.

A cryogenic fuel system 48 includes at least a fuel tank 50 and a fuel pump 52 to provide a liquid fuel flow 56 through a fuel passage to the combustor 28. The example fuel system 48 is configured to provide a hydrogen based fuel such as a liquid hydrogen ($LH_2$). Although hydrogen is disclosed by way of example, other cryogenic, non-carbon based fuels could be utilized and are within the contemplation of this disclosure.

An exhaust heat exchanger 46 is disposed downstream of a first heat exchanger 44 and provides further heating and transformation into the vaporized fuel flow 58. The vaporized fuel flow 58 is injected into the combustor 28 to generate the exhaust gas flow 42.

The fuel in the tank 50 incudes features for storing a cryogenic fuel at temperatures required to maintain the fuel in a liquid phase. Temperatures required to maintain the cryogenic fuel in a liquid phase may be as low as about −412° F. In one example embodiment, the cryogenic fuel is maintained at a temperature below 0° F. In another example embodiment, the fuel is maintained in the tank 50 at temperatures below −100° F. The cryogenic fuel may be maintained at temperatures below about −150° F. and as low as about −435° F.

The low temperatures of the cryogenic fuel 56 provide a source of heat absorption that is utilized in a bottoming cycle 60. The bottoming cycle 60 provides for recovering thermal energy otherwise lost as exhaust through the nozzle 32.

The bottoming cycle 60 includes a primary compressor loop 68 and a secondary compressor loop 70. A first bottoming compressor 62 is disposed in the primary compressor loop 68 and a second bottoming compressor 64 is disposed within the secondary compressor loop 70. Working fluid flow in the primary compressor loop 68 is communicated through a fuel/working fluid heat exchanger 54. The fuel/working fluid heat exchanger 54 provides for cooling of the working fluid flow prior to entering the first bottoming compressor 62. The secondary compressor loop 70 bypasses the fuel/working fluid heat exchanger 54. Bypassing the fuel/working fluid heat exchanger 54 provides for the working fluid flow and thereby operation of the bottoming cycle 60 to be tailored to operation of the core engine 24.

The example bottoming cycle 60 receives heat from the exhaust gas flow 42 through a first heat exchanger 44. The example bottoming cycle 60 further includes a first recuperating heat exchanger 76 and a second recuperating heat exchanger 78. Each of the recuperating heat exchangers 76, 78 provide for the communication of thermal energy between working fluid flow at different temperatures within the bottoming cycle 60. In the disclosed example, a hotter working fluid flow indicated at 74 is in communication with the second recuperative heat exchanger 78. Heat from the working fluid flow 74 is transferred into working fluid flow that has exited one of the first bottoming compressors 62 or the second bottoming compressors 64 and before entering the bottoming turbine 66. The additional heat added to the working fluid flow prior to entering the bottoming turbine 66 increases bottoming cycle efficiency.

The first recuperative heat exchanger 76 is disposed within the primary compressor loop 68. The second recuperative heat exchanger 78 is disposed within the secondary compressor loop 70. The primary compressor loop 68 includes the secondary compressor loop 70 and an additional portion. Accordingly, the primary compressor loop 68 has a larger volume capacity for the working fluid.

The secondary compressor loop 70 is defined by a bypass that directs working fluid around the fuel/working fluid heat exchanger 54 and the first bottoming compressor 62.

Accordingly, the volume for working fluid in the secondary compressor loop is less than that of primary compressor loop 68. Working fluid flow flowing through the secondary compressor loop 70 proceeds through only the second compressor 64 before being communicated through the second recuperative heat exchanger 78 and the first heat exchanger 44.

Working fluid flow that is provided through the primary compressor loop 68 flows through both the first and second recuperative heat exchangers 76, 78, the fuel/working fluid heat exchanger 54. Compressed working fluid flow exiting from the first bottoming compressor 62 flows through the first recuperative heat exchanger 76 and then is bypassed around the second bottoming compressor 64 into thermal communication with the second recuperative heat exchanger 78. From the second recuperative heat exchanger 78, the working fluid flow is further heated by the first heat exchanger 44 and then expanded through the bottoming turbine 66.

Operation of the core engine 24 determines the flow rate for the cryogenic fuel 56 communicated from the cryogenic fuel system to the combustor 28. Changing demand by the core engine 24 for fuel changes the capability of the fuel flow 56 to absorb heat from the working fluid. Variation in the capability of the fuel to absorb heat can result in the bottoming cycle 60 operating outside the most efficient parameters. Accordingly, the example bottoming cycle 60 is operable to adapt to the capacity for the cryogenic fuel 56 to absorb heat.

A valve system 104 is provided to switch operation between the primary compressor loop 68 and the secondary compressor loop 70, to adapt heat rejection, compression, and a volume of working fluid with the bottoming cycle 60. The example valve system 104 includes a first valve 80 and a second valve 82 that are controlled by a controller 86. The controller 86 is programed to operate the valves 80, 82 to open and close, to selectively switch between operation using the primary compressor loop 68 and the secondary compressor loop 70 based on engine operating information schematically indicated at 92 and fuel flow information schematically indicated at 94.

The example controller 86 may be specially constructed for operation of the valve system 104, or it may comprise at least a general-purpose computer selectively activated or reconfigured by software instructions stored in a memory device. The controller 86 may further be part of full authority digital engine control (FADEC) or an electronic engine controller (EEC).

In one operational embodiment, the bottoming cycle 60 operates such that working fluid flows through the primary compressor loop 68, including the first bottoming compressor 62. The working fluid flow is compressed in the first bottoming compressor 62, heated in the first recuperated heat exchanger 76, bypassed around the second bottoming compressor 64 and into thermal communication with the second recuperative heat exchanger 78. In the second recuperative heat exchanger 78, the working fluid flow is further heated before further heating in the first heat exchanger 44. The first heat exchanger 44 communicates thermal energy from the exhaust gas flow 42 to provide a final heating of the working fluid flow prior to expansion through the bottoming turbine 66.

The first heat exchanger 44 provides more thermal energy into the working fluid flow than either of the recuperative heat exchangers 76, 78. Accordingly, heat energy is input into the working fluid flow by the recuperative heat exchangers first, followed by thermal energy from the exhaust gas heat exchanger 44.

In instances where operation of the core engine 24 and flow of the cryogenic fuel 56 is such that a reduction in the efficiency of the bottoming cycle 60 may occur, the valves 80 and 82 are actuated such that working fluid flow is bypassed around the fuel/working fluid heat exchanger 54 and the recuperative heat exchanger 76. When the working fluid flow is routed only through the secondary compressor loop 70, it flows first through the second bottoming compressor 64 then through the second recuperative heat exchanger 78 followed by flow through the first heat exchanger 44. Flowing of the working fluid through the secondary compressor loop 70 provides higher flow rates that improve efficiency where heat absorption by the cryogenic fuel is limited.

Power generated by the bottoming turbine 66 is utilized to drive a generator 90 through a bottoming shaft 88. The generator 90 produces electric power that may be used by other engine and aircraft systems. In one example embodiment, an electric motor 36 is coupled to the engine shaft 34. The electric motor 36 may be operated to input power to the engine shaft 34 to supplement power provided by the turbine 30. Although an example use of power from the bottoming cycle 60 is disclosed, other uses of the power recovered by operation of the bottoming turbine 66 are within the contemplation and scope of this disclosure.

Figure 2:
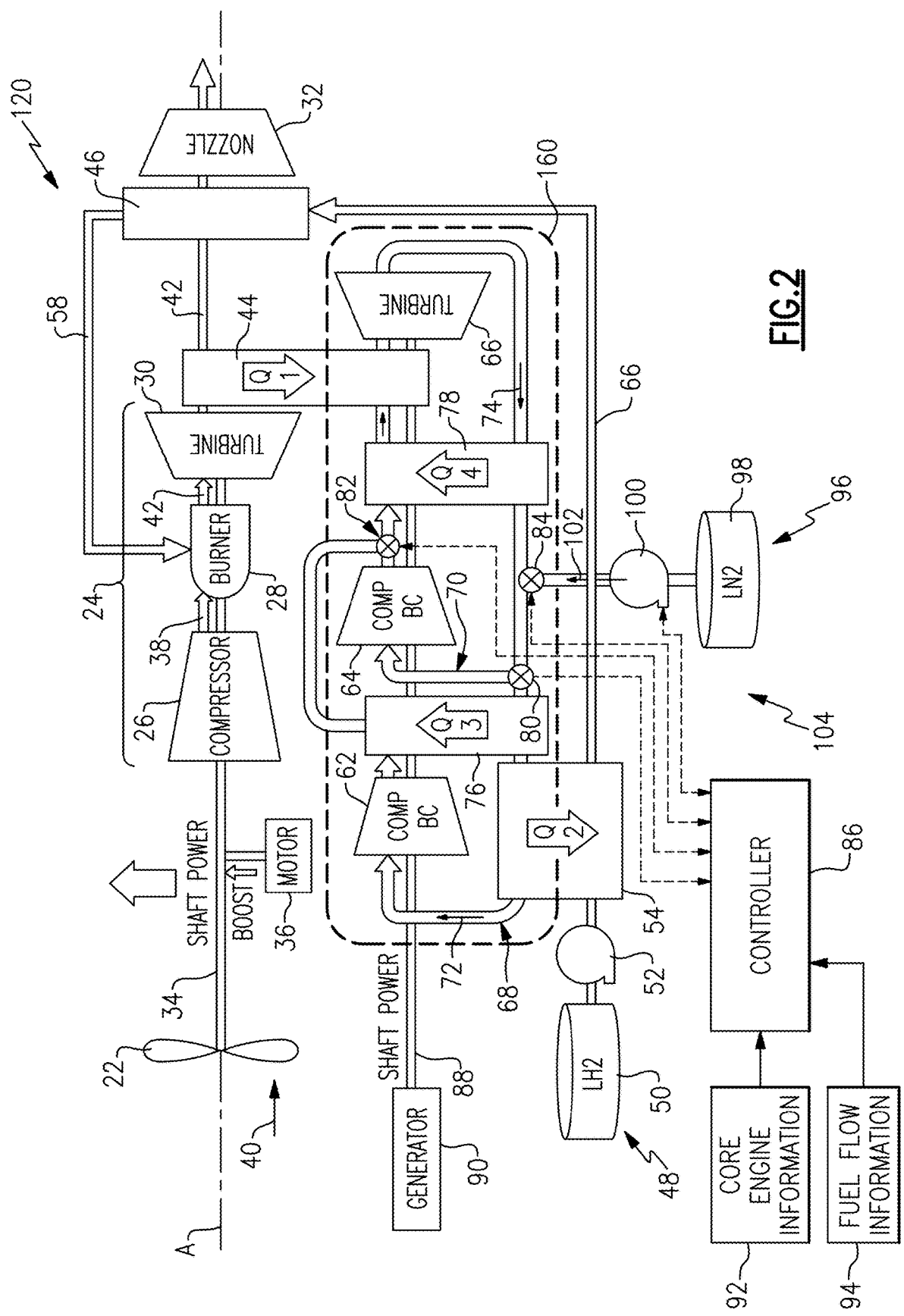
FIG. 2 is a schematic view of another example aircraft propulsion system including another example adaptable bottoming cycle.

Referring to FIG. 2, another example aircraft propulsion system 120 includes a bottoming cycle 160. The features of the bottoming cycle 160 are substantially the same as those indicated and described with regard to the bottoming cycle 60 shown in FIG. 1. The example bottoming cycle 160 adds a charging system 96 that provides for changes in a volume of working fluid flow within the primary compressor loop 68 and the secondary compressor loop 70.

The amount of working fluid in the bottoming cycle 160 may be varied to further adjust operation to match core engine operation and heat absorption capabilities.

The example charging system 96 includes a storage tank 98 and a pump 100 and provides an additional amount of working fluid flow 102. The charging system 96 is in fluid communication with the primary compressor loop 68 and the secondary compressor loop 70 through a third valve 84. In one example disclosed embodiment, the working fluid flow is a liquid nitrogen that may be stored in the tank 98. The liquid nitrogen may also be produced aboard the aircraft and communicated to the bottoming cycle 160 as required through the charging system 96.

In one example embodiment, when the bottoming cycle 160 is operable and flowing working fluid flow through the primary compressor loop 68, the charging system 96 provides a sufficient amount of working fluid flow to provide a desired level of operation.

Upon an indication that a change in capacity to absorb heat is determined based on the information regarding core engine 92 and fuel flow 94, the controller 86 operates the valve system 104 to adjust operation to one of the primary and secondary compressor loops 68, 70. Switching from operation of the primary compressor loop 68 to operation of the secondary compressor loop 70 requires a reduction in the amount of working fluid. The valve system 104 is operated to close off portions of the primary compressor loop 68. Additionally, a third valve is actuated to provide for removal of some portion of working fluid into the charging system 96.

Switching from the secondary compressor loop 70 to operation using the primary compressor loop 68 occurs by actuating the valve system 104 bypass around the second bottoming compressor 64. The additional volume provided by the primary compressor loop 68 requires more working fluid. Accordingly, the charging system 96 communicates additional working fluid flow into the primary compressor loop 68 through the valve 84.

Moreover, the charging system 96 may be operated independent of switching between the primary and secondary compressor loops 68, 70. Adjustments to the volume of working fluid within the bottoming cycle 160 may be utilized to adjust operation based on information provided to the controller 86.

Accordingly, the disclosed propulsion systems 20, 120 provide for the tailoring of the bottoming cycle to operate to accommodate variations in operation of the core engine and the fuel flow.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. An aircraft propulsion system comprising:
a core engine comprising a main compressor where an inlet airflow is compressed and communicated to a combustor to generate an exhaust gas flow that is expanded through a main turbine section to generate power used to drive the main compressor and a propulsive fan;
a bottoming cycle where a working fluid is heated and expanded through a bottom turbine to generate shaft power, wherein the bottoming cycle comprises a primary compressor loop including a first bottoming compressor and a secondary compressor loop including a second bottoming compressor and the flow of working fluid flow is adjusted to flow through at least one of the primary compressor loop and the secondary compressor loop;
an exhaust gas heat exchanger where heat from the exhaust gas flow heats the working fluid of the bottoming cycle;
a cryogenic fuel system comprising a cryogenic fuel storage tank, a fuel flow path for routing the cryogenic fuel to the combustor of the core engine;
a fuel/working fluid heat exchanger for cooling the working fluid within the primary compressor loop, wherein the secondary compressor loop bypasses the fuel/working fluid heat exchanger;
a first recuperation heat exchanger communicating thermal energy between a working fluid flow downstream from both the first bottoming compressor and the second bottoming compressor with working fluid flow downstream from the bottoming turbine; and
a second recuperation heat exchanger communicating thermal energy between a working fluid flow between the first bottoming compressor and second bottoming compressor and downstream from the bottoming turbine.

2. The aircraft propulsion system as recited in claim 1, wherein the primary compressor loop comprises a bypass passage around the second bottoming compressor.

3. The aircraft propulsion system as recited in claim 1, further comprising a valve system for selectively directing the working fluid through at least one or both of the primary compressor loop and the secondary compressor loop.

4. The aircraft propulsion system as recited in claim 3, further comprising a controller for operating the valve system to adjust operation of the bottoming cycle in response to available thermal capacity of the cryogenic fuel system to absorb heat.

5. The aircraft propulsion system as recited in claim 1, further comprising a charger system for maintaining a desired volume of working fluid within the primary compressor loop and the secondary compressor loop.

6. The aircraft propulsion system as recited in claim 1, further comprising a fuel/exhaust gas heat exchanger where the cryogenic fuel flow is heated before being communicated to the combustor of the core engine.

7. The aircraft propulsion system as recited in claim 1, further comprising an output shaft driven by the bottoming turbine for driving an accessory component.

8. An aircraft propulsion system comprising:
a core engine comprising a main compressor where an inlet airflow is compressed and communicated to a combustor to generate an exhaust gas flow that is expanded through a main turbine section to generate power used to drive the main compressor and a propulsive fan;
a bottoming cycle where a working fluid is heated and expanded through a bottom turbine to generate shaft power, wherein the bottoming cycle comprises a primary compressor loop including a first bottoming compressor and a secondary compressor loop including a second bottoming compressor and the flow of working fluid flow is adjusted to flow through at least one of the primary compressor loop and the secondary compressor loop;

an exhaust gas heat exchanger where heat from the exhaust gas flow heats the working fluid of the bottoming cycle;

a cryogenic fuel system comprising a cryogenic fuel storage tank, a fuel flow path for routing the cryogenic fuel to the combustor of the core engine; and a fuel/working fluid heat exchanger for cooling the working fluid within the primary compressor loop, wherein the secondary compressor loop bypasses the fuel/working fluid heat exchanger a controller for operating the valve system to adjust operation of the bottoming cycle in response to available thermal capacity of the cryogenic fuel system to absorb heat, wherein the controller is further programmed to operate a charger system to maintain a desired volume of working fluid based on operation of the primary compressor loop and the secondary compressor loop.

9. A gas turbine engine comprising:

a core engine comprising a main compressor where an inlet airflow is compressed and communicated to a combustor to generate an exhaust gas flow that is expanded through a main turbine section to generate power used to drive the main compressor;

a bottoming cycle where a working fluid is heated and expanded through a bottom turbine to generate shaft power, wherein the bottoming cycle comprises a primary compressor loop including a first bottoming compressor and a secondary compressor loop including a second bottoming compressor and the flow of working fluid flow is adjusted to flow through one of the primary compressor loop or the secondary compressor loop, wherein the primary compressor loop comprises a bypass passage around the second bottoming compressor;

an exhaust gas heat exchanger where heat from the exhaust gas flow heats the working fluid of the bottoming cycle;

a cryogenic fuel system comprising a cryogenic fuel storage tank, a fuel flow path for routing the cryogenic fuel to the combustor of the core engine;

a fuel/working fluid heat exchanger for cooling the working fluid within the primary compressor loop, wherein the secondary compressor loop bypasses the fuel/working fluid heat exchanger; and a controller programmed to adjust operation of the bottoming cycle to route the working fluid flow through one of the primary compressor loop and the secondary compressor loop in response to available thermal capacity of the cryogenic fuel system to absorb heat.

10. The gas turbine engine as recited in claim 9, further comprising at least one recuperation heat exchanger communicating thermal energy between a working fluid flow exhausted from at least one of the first bottoming compressor and the second bottoming compressor with working fluid flow exhausted from the bottoming turbine and before either of the first bottoming compressor and the second bottoming compressor.

11. The gas turbine engine as recited in claim 9, further comprising a fuel/exhaust gas heat exchanger where the cryogenic fuel flow is heated before being communicated to the combustor of the core engine.

12. The gas turbine engine as recited in claim 9, further comprising an output shaft driven by the bottoming turbine for driving an accessory component.

13. The gas turbine engine as recited in claim 9, further comprising a propulsive fan driven by the core engine.

14. A gas turbine engine comprising:

a core engine comprising a main compressor where an inlet airflow is compressed and communicated to a combustor to generate an exhaust gas flow that is expanded through a main turbine section to generate power used to drive the main compressor;

a bottoming cycle where a working fluid is heated and expanded through a bottom turbine to generate shaft power, wherein the bottoming cycle comprises a primary compressor loop including a first bottoming compressor and a secondary compressor loop including a second bottoming compressor and the flow of working fluid flow is adjusted to flow through one of the primary compressor loop or the secondary compressor loop an exhaust gas heat exchanger where heat from the exhaust gas flow heats the working fluid of the bottoming cycle;

a cryogenic fuel system comprising a cryogenic fuel storage tank, a fuel flow path for routing the cryogenic fuel to the combustor of the core engine;

a fuel/working fluid heat exchanger for cooling the working fluid within the primary compressor loop, wherein the secondary compressor loop bypasses the fuel/working fluid heat exchanger;

a controller programmed to adjust operation of the bottoming cycle to route the working fluid flow through one of the primary compressor loop and the secondary compressor loop in response to available thermal capacity of the cryogenic fuel system to absorb heat; and a charger system for maintaining a desired volume of working fluid within the primary compressor loop and the secondary compressor loop, wherein the controller is further programmed to operate the charger system to maintain a desired volume of working fluid based on operation of the primary compressor loop and the secondary compressor loop.

15. A method of operating an aircraft propulsion system comprising:

generating an exhaust gas flow in a combustor by igniting a mixture of compressed air and a cryogenic fuel;

communicating thermal energy from the exhaust gas flow into a working fluid within a bottoming cycle where a heated working fluid is heated and expanded through a bottom turbine to generate shaft power, wherein the bottoming cycle comprises a primary compressor loop including a first bottoming compressor and a secondary compressor loop including a second bottoming compressor and the flow of working fluid flow is adjusted to flow through one of the primary compressor loop or the secondary compressor loop, wherein primary compressor loop comprises a bypass passage around the second bottoming compressor;

cooling the working fluid exhausted from the bottoming turbine in a fuel/working fluid heat exchanger where a cryogenic fuel accepts heat from the working fluid, wherein working fluid flow through the secondary compressor loop bypasses the fuel/working fluid heat exchanger; and adjusting a flow of the working fluid to flow within one of the primary compressor loop and the secondary compressor loop based on a determined available thermal capacity of the cryogenic fuel system to absorb heat from the working fluid, wherein adjusting the flow of the working fluid further comprises directing the working fluid flow through the bypass passage and around the second bottoming compressor.

16. The method as recited in claim 15, further comprising adjusting a volume of the working fluid within the primary compressor loop and the secondary compressor loop based on operation of the primary compressor loop and the secondary compressor loop.

17. The method as recited in claim 15, further comprising communicating thermal energy between a working fluid flow exhausted from at least one of the first bottoming compressor and the second bottoming compressor with working fluid flow exhausted from the bottoming turbine and before either of the first bottoming compressor and the second bottoming compressor with at least one recuperation heat exchanger.

* * * * *